United States Patent
Broome et al.

[11] Patent Number: 6,088,322
[45] Date of Patent: Jul. 11, 2000

[54] SINGLE OBJECTIVE LENS FOR USE WITH CD OR DVD OPTICAL DISKS

[76] Inventors: Barry G. Broome, 4812 Courageous La., Carlsbad, Calif. 92008; Jenkin A Richard, 1375 Montecito Ave. #13, Mountain View, Calif. 94043

[21] Appl. No.: 09/074,474

[22] Filed: May 7, 1998

[51] Int. Cl.[7] .................................................. G11B 7/00
[52] U.S. Cl. .................. 369/112; 369/44.24; 369/44.37; 369/94; 369/109; 369/118
[58] Field of Search ................. 369/112, 44.24, 369/44.37, 118, 94, 44.12, 44.23, 109, 110, 103; 359/357, 356

[56] References Cited

U.S. PATENT DOCUMENTS

| | | | |
|---|---|---|---|
| 5,044,706 | 9/1991 | Chen | 359/357 |
| 5,703,862 | 12/1997 | Lee et al. | 369/112 |
| 5,777,970 | 7/1998 | Kajiyama et al. | 369/94 |
| 5,808,999 | 9/1998 | Yagi | 369/112 |
| 5,835,473 | 11/1999 | Shimozono et al. | 369/112 |
| 5,838,496 | 11/1998 | Maruyama et al. | . |
| 5,870,369 | 2/1999 | Chung | 369/112 |
| 5,883,874 | 3/1999 | Choi | 369/112 |
| 5,889,748 | 3/1999 | Shimano et al. | 369/112 |
| 5,933,401 | 8/1999 | Lee et al. | 369/112 |
| 5,978,346 | 11/1999 | Mizuno et al. | 369/112 |

FOREIGN PATENT DOCUMENTS

| | | |
|---|---|---|
| 0838812A2 | 4/1998 | European Pat. Off. . |
| 0844606A1 | 5/1998 | European Pat. Off. . |
| 09179020A | 7/1997 | Japan . |

*Primary Examiner*—Tan Dinh
*Assistant Examiner*—Kim-Kwok Chu
*Attorney, Agent, or Firm*—Bruce H. Johnsonbaugh

[57] ABSTRACT

An optical disk reader or read/write system for CD or DVD formats. First and second laser diodes operating at different wavelengths have their output beams collimated and directed at a single element objective lens, and are then reflected off the disk back through the lens to a photodetector. The single element objective lens has a central aperture zone and an outer aperture zone, the central zone being profiled to operate at a first numerical aperture at approximately 0.45 and the output beam of the first laser diode is confined to the central aperture zone. The outer aperture zone together with the central aperture zone are profiled to operate at a second numerical aperture, for example 0.60 wherein the output beam of the second laser diode has ray fans extending across the full aperture of the single element objective lens. A diffractive is formed on one surface of the single element objective lens and provides sufficient aspheric surface power for spherical aberration correction as well as correction for spherochromatism. The diffractive also provides sufficient correction for spherical aberration and spherochromatism that the single element objective lens achieves diffraction-limited image quality for both CD and DVD formats.

8 Claims, 12 Drawing Sheets

SINGLE OBJECTIVE LENS FOR USE WITH CD OR DVD OPTICAL DISKS

BACKGROUND AND BRIEF SUMMARY OF THE INVENTION

The present invention relates to a single objective lens that can be used with either CD optical disks or DVD optical disks. Several different formats of optical disk are known in the prior art. The two most commonly used formats are the CD and the DVD. These two optical disk formats store different data densities; the DVD uses a much smaller track and much smaller "pits" to record a higher data density. The CD (Compact Disk) appears in wide use as both a CD-DA (Company Disk-Digital Audio) and a CD-ROM (Compact Disk-Read Only Memory); the format is identical for these two species. The DVD (Digital Versatile Disk) appears in use as a digital video (movie) storage or an extended computer memory product.

Data records on both CD and DVD formats are in "pits" formed in a reflective surface of the disk. These "pits" are actually in the form of short "trenches" that lie along a track that spirals around the disk surface. The CD "pit" is typically 0.50 micrometer (uM) wide and between 0.83 to 3.05 uM long. The track pitch is 1.6 uM and the depth of the "pit" is 0.20 uM. To achieve higher data density, the DVD "pit" is typically 0.3 uM wide and between 0.40 to 1.5 uM long. The track pitch is 0.74 uM and the "pit" depth is 0.16 uM. The CD can reliably record about 650 MB of digital data whereas the DVD can reliably record about 4.7 GB of digital data on one side of the disk (both sides can be used on a DVD).

The width and depth of the CD "pit" was determined by A early optical fabrication technology which limited the objective lens to 0.45 NA (Numerical Aperture), and by early laser diode technology (a 780 nm emission line). Because cost-effective objective lenses could be made no faster than 0.45 NA (i.e. a relative aperture of f/1.11) and lower wavelength laser diode emission lines were not available, the size of a diffraction-limited laser spot image was limited to 1.0 uM at the Full-Width-Half-Maximum intensity points (FWHM). The CD "pit" depth is chosen to be one-fourth of the laser wavelength (0.20 uM) and the "pit" width is chosen to be about half the laser spot diameter (0.50 uM). This arrangement permits about half of the wavefront in the laser spot to reflect from the bottom of the "pit" and about half of the wavefront to reflect from the surface surrounding the "pit." The two reflected components are half a wavelength out of phase so they interfere destructively. No signal is returned to the objective lens when a "pit" is present. When no "pit" is present, the full wavefront reflects from the surrounding surface and light is returned to the objective lens.

This is the digital encoding process for most optical disks.

There are other subtle effects that this encoding process introduces such as diffraction at the edges of the pit, but the interference process is thought to be the principal phenomenon.

The newer DVD format has been enabled by two technology developments; a 650 nm laser diode has become commercially viable and 0.60 NA objective lenses have become cost-effective. The A combination of these two factors produces a diffraction-limited laser spot with 0.64 uM FWHM, so the DVD "pit" width becomes 0.32 uM and the "pit" depth becomes 0.16 uM.

Several optical disk products have been produced in the prior art that combine CD and DVD formats in the same optical reader. In order to achieve this goal, the prior art uses two laser diodes plus two lenses and moves either one set (laser diode plus objective for CD format) or the other set (laser diode plus objective for DVD format) over the disk that is to be read. No prior art single objective design is known that can operate with either the CD or DVD formats.

The invention of this application is a single lens that can operate with either the CD format (with 780 nm laser diode) or with the DVD format (with 650 nm laser diode). No moving parts are required with this invention because the appropriate laser diode can be turned on electrically and introduced to the objective lens via a dichroic beamsplitter or a grating structure.

DETAILED DESCRIPTION OF THE DRAWINGS

Figure 1:
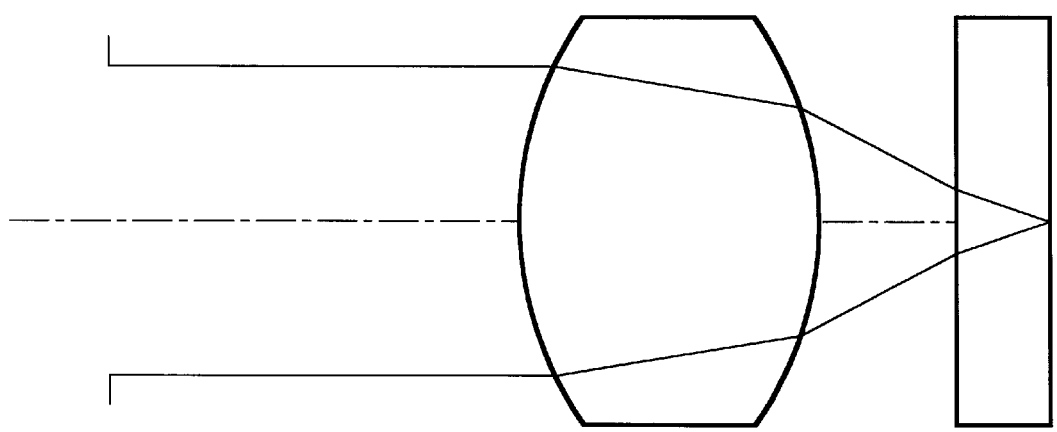
FIG. 1 is a schematic representation of a typical prior art CD objective lens.

FIG. 1 shows a typical prior art CD objective operating at 0.45 NA and with a 780 nm laser diode source. This objective uses injection molded PMMA plastic plus aspheric surfaces on both sides of the lens. The objective forms a diffraction-limited image on the rear surface of a 1.2 mm thick polycarbonate plastic cover on the CD.

Figure 2:
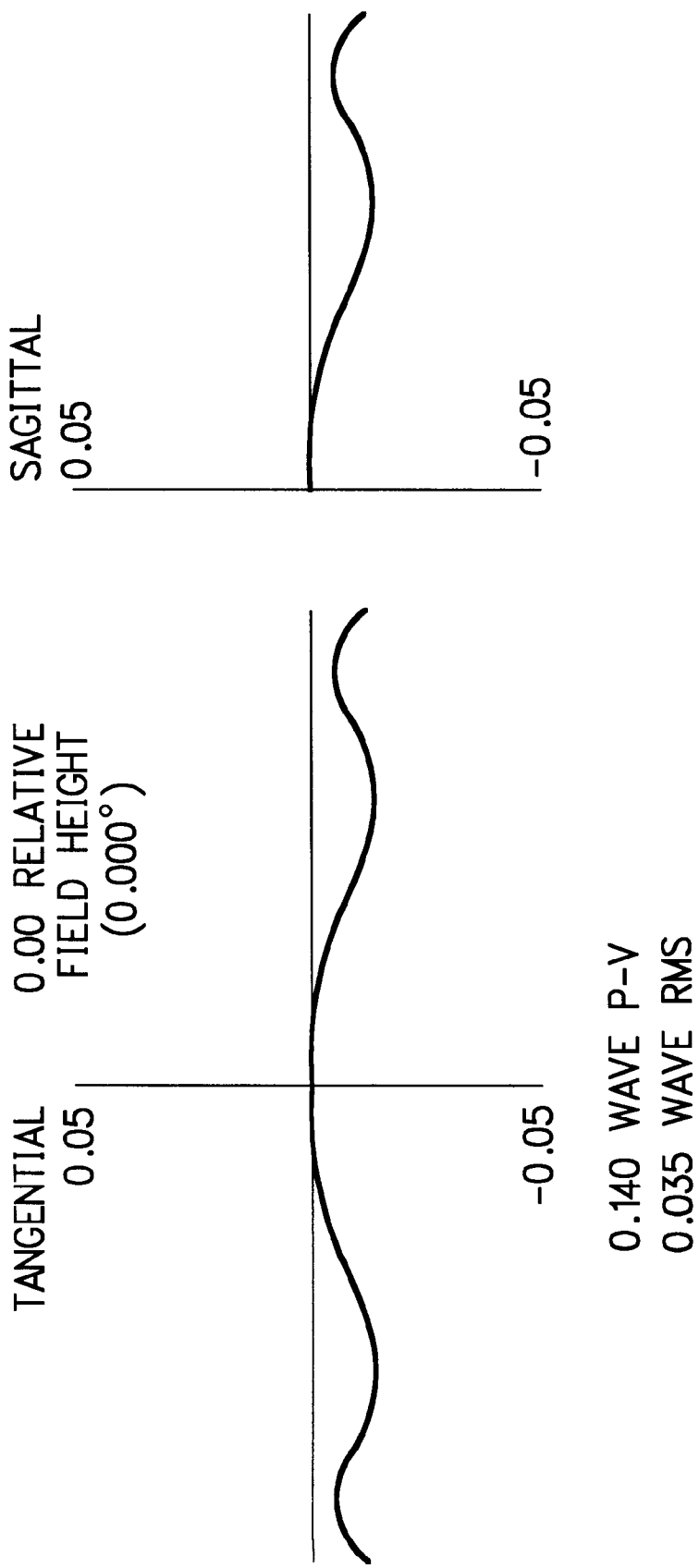
FIG. 2 shows the wavefront error of the prior art objective lens shown in FIG. 1.

FIG. 2 shows the wavefront error of the prior art system of FIG. 1 (the horizontal axis is the dimension across the lens aperture and the vertical axis is the wavefront error). The Marechal condition for a diffraction-limited optical system is 0.070 RMS waves. This prior art lens has a 0.035 RMS wavefront error and is diffraction-limited by this criterion. This RMS wavefront error is equivalent to a 0.140 P-V wavefront error and the Rayleigh criterion for a diffraction-limited lens is a wavefront error of less than 0.250 PV waves, so the lens is diffraction-limited by this criterion as well.

Figure 3:
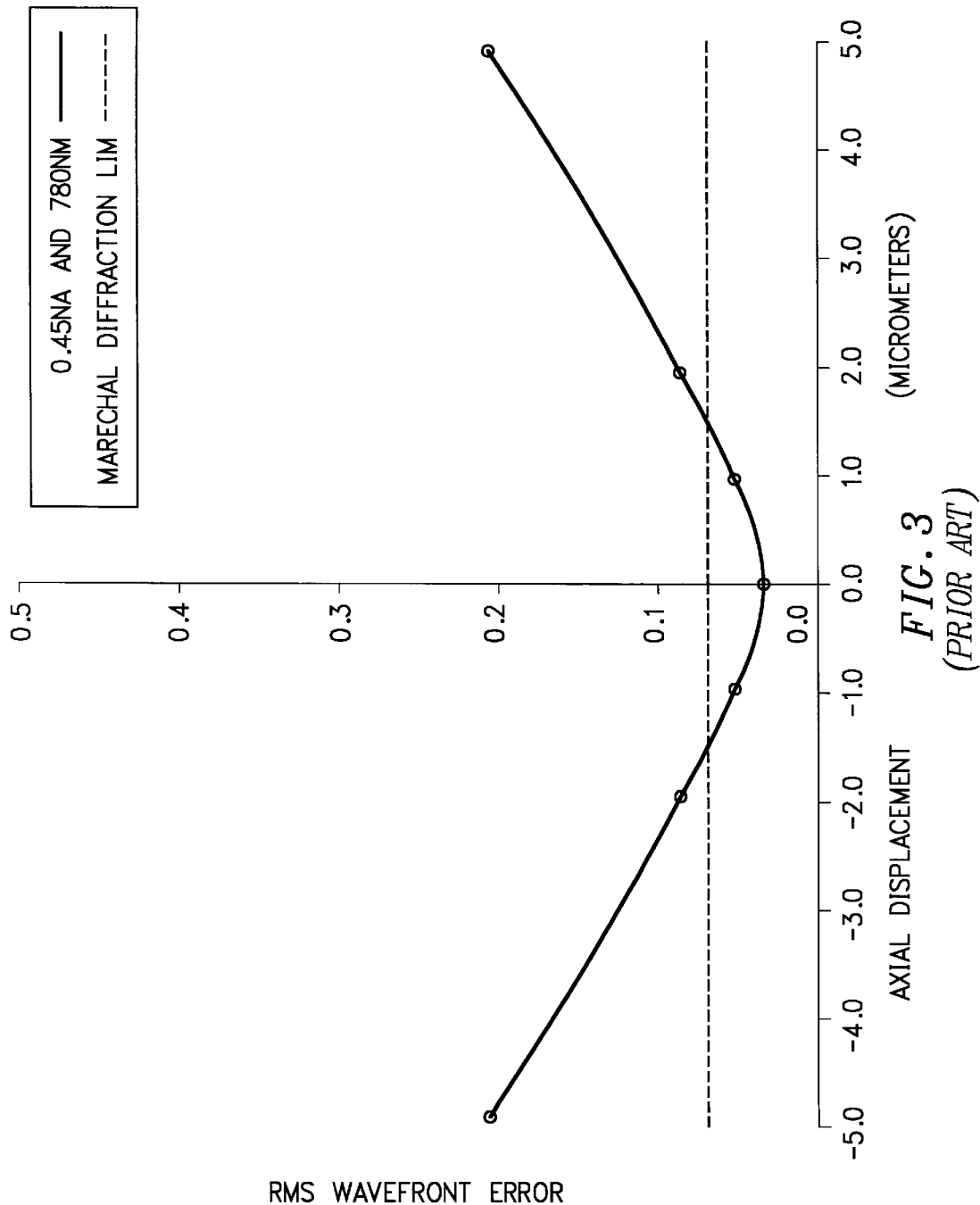
FIG. 3 is a graphical representation of the depth of focus defined as the RMS wavefront error of the prior art lens of FIG. 1.

FIG. 3 shows the RMS wavefront error of the prior art system of FIG. 1 as a function of the depth of focus. Because the objective must be rapidly auto-focused during reading operations, there must be a useful depth of focus where the objective performance is essentially diffraction-limited. This prior art nominal design is essentially diffraction-limited over a +/−1.5 micrometer range. When the objective is manufactured, fabrication tolerances reduce performance and the useful depth of focus is reduced to about +/−1.0 micrometer. The essentially diffraction-limited depth of focus requirement forces very stringent fabrication tolerances on this class of objective lens.

Figure 4:
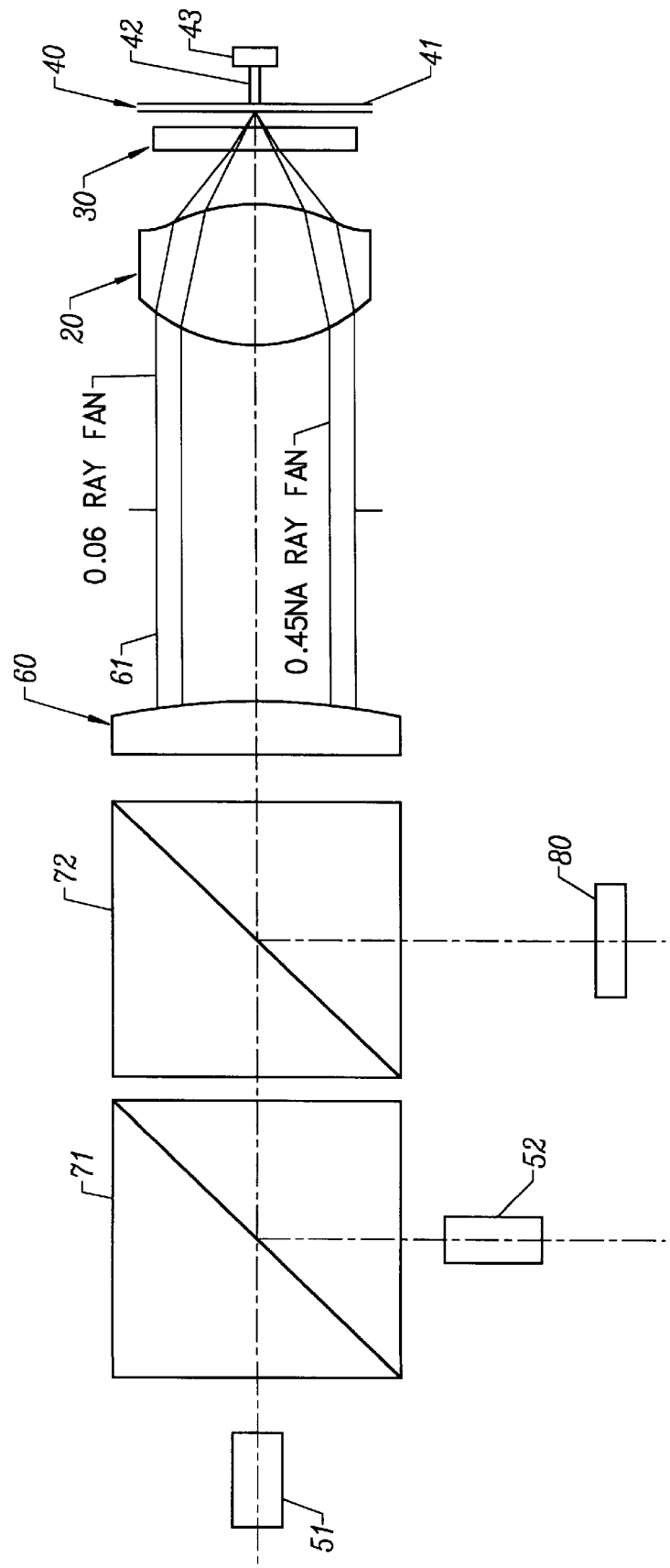
FIG. 4 shows a single objective lens according to the present invention and related system components operating with either a CD format (0.45 NA ray fan and thick disk substrate) or a DVD format (0.60 NA ray fan and thin disk substrate)

FIG. 4 shows the first embodiment of the objective lens design of the present invention that could operate with both CD and DVD formats. Lens 20 has a large aperture that permits ray fans for either a 0.45 NA (and 780 nm laser diode) operation or a 0.60 NA (and 650 nm laser diode) operation. This figure shows that the central zone of the lens must be used to control the 0.45 NA and 780 nm laser diode operation and that the outer zone can be independently designed for the 0.60 NA and 650 nm laser diode operation. However, the central zone will also contribute to the 0.60 NA and 650 nm laser diode operation and this is the reason that prior art objectives designers have not been able to use a single element objective for both CD and DVD reader systems. As shown in FIG. 4, disk 30 may either be a DVD format disk or a CD format disk. Disk support and drive means shown generally as 40 includes a conventional drive plate 41, spindle 42 and drive motor 43 as known in the art. First and second laser diodes 51 and 52, respectively, operate with output beams of approximately 780 nm and 650 nm, respectively. The laser diode output beams pass through beam-splitters 71 and 72 and are directed towards collimating lens 60. Light 61 exiting the collimating lens 60 passes through single element objective lens 20, is reflected from the CD or DVD disk, and is deflected by beam-splitter 72 onto photodetector 80, where changes in output power are utilized to read the disk, as is known in the art. It is significant that the single element objective lens 20 of the present invention is positioned between the beam-splitter 70 and disk 30 in a pathway of collimated light. Several of the prior art systems position the objective lens in a pathway of non-collimated light requiring that the placement of the objective lens be very precise. The placement of components shown in FIG. 4 can be varied without departing from the invention and alternate beam-splitters and collimators may be used. Although the embodiments shown and discussed herein disclose lasers 51 and 52 operating at 780 nm and 650 mn, it is to be understood that the invention can be applied to the general case wherein lasers can be operated with different output wavelengths including shorter wavelength lasers as they become commercially available. Another significant aspect of the single element objective lens 20 as used in the present invention is that the lens is a single optical element in contrast to the typical two element prior art design which utilizes either an objective lens and hologram or an objective lens and a second lens element. Full alignment of both elements in the prior art requires alignment of five degrees of freedom of the two combined elements (centration of both elements and two degrees of tilt for each element), whereas the use of the single element, fixed objective lens 20 of the present invention greatly simplifies alignment of the lens.

Figure 5:
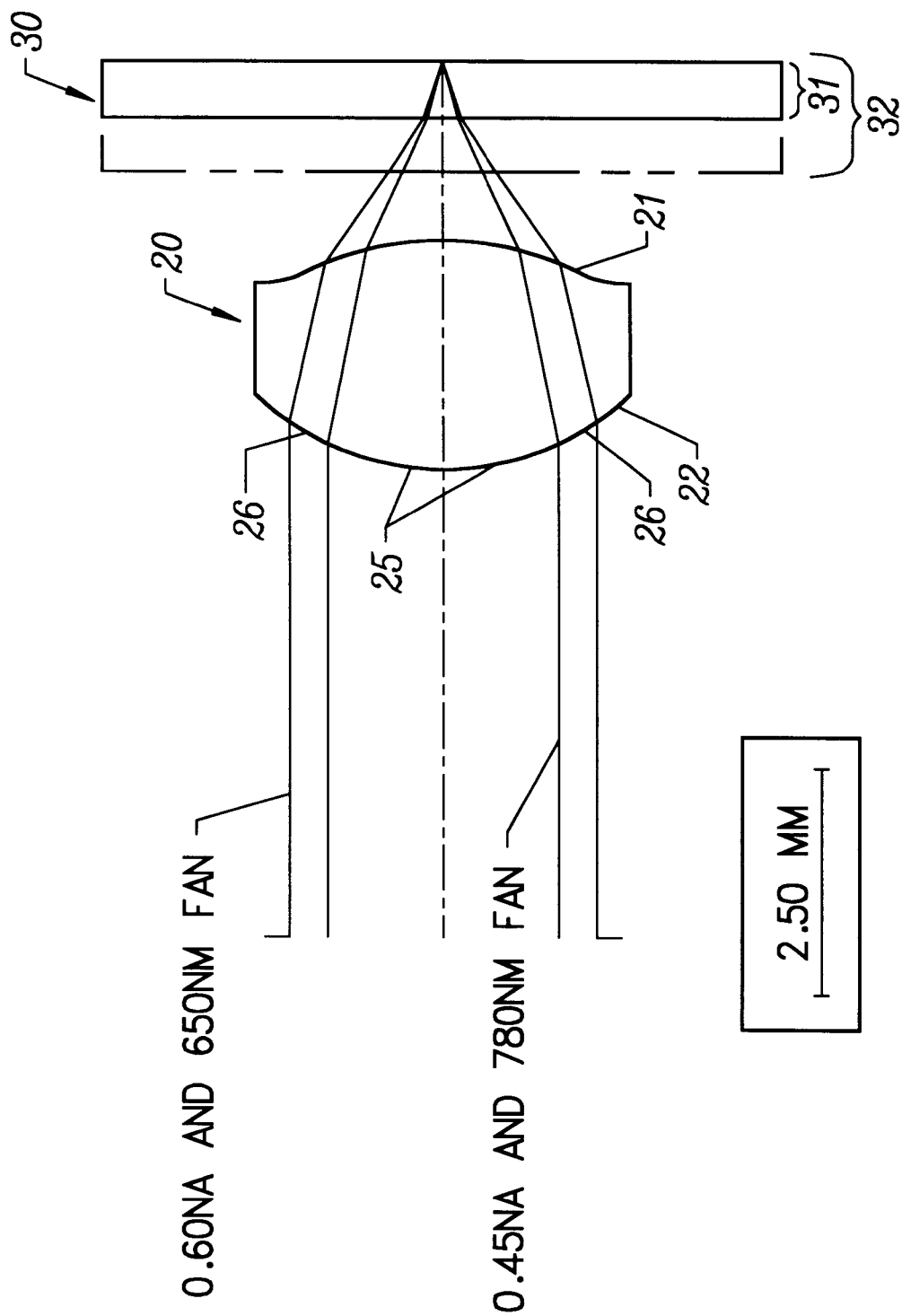
FIG. 5 shows a schematic representation of one embodiment of the single objective lens according to the present invention using aspheric surfaces.

The first embodiment of the present invention is shown in greater detail in FIG. 5. This is a molded COC (Cyclic Olefin Copolymer) plastic lens 20 with aspheric first surface 21 and aspheric second surface 22. This invention uses the fact that the polycarbonate disk cover plate 30 varies from 0.6 mm in the DVD format 31 to 1.2 mm in the CD format 32 and that the spherical aberration introduced by the plate is twice as large for the CD format. Concurrently, the objective DVD format NA is 0.60 and introduces nearly 2.4 times the spherical aberration that the CD format 0.45 NA introduces to the system. The spherical aberration of the cover plate and the spherical aberration of the objective, therefore, work in concert for the CD and for the DVD systems to produce similar amounts of system spherical aberration. Although the amount of spherical aberration for the two systems is similar, the distribution of spherical aberration across the aperture of the lens is different for the two systems and this limits the aberration correction to a less than diffraction-limited condition. In addition, the CD and DVD systems operate at different wavelengths and the refractive index of the plastic changes with wavelength in such a way that the distribution of spherical aberration across the lens aperture also changes with wavelength. Optical designers recognize this condition as spherochromatism.

The first embodiment of this invention utilizes the discovery that a single element objective lens can be used for both CD and DVD operation because the amount of spherical aberration for the two systems is similar and can be controlled to nearly diffraction-limited levels by the correct choice of aspheric surface profiles in the central zone 25 and in the outer zone 26 of the objective.

FIG. 5 shows the first embodiment objective. The 0.45 NA, 780 nm ray fans are shown passing through the central zone 25 of the lens aperture. The 0.60 NA, 650 nm ray fans are shown extending across the full aperture of the lens, which includes the central zone 25 and outer zone 26. Although the diameter of the outer zone appears only slightly larger than the central zone diameter, nearly 0.5 of the energy in the DVD system resides in this outer zone. The ability to independently modify these outer zone surface profiles gives the designer a strong control of the DVD system aberrations that is independent of the CD system aberrations. The two different cover plate thicknesses are shown in this figure. The laser diodes and disk drive are not shown.

The first surface 21 and second surface 22 shown in FIG. 5 can be described in the following mathematical terms:

a first aspheric surface defined as:

$$sag_1 = \frac{\rho_1 r^2}{1 + SQT[1 - (1 + k_1)\rho_1^2 r^2]} + A_1 r^4 + B_1 r^6 + C_1 r^8 + D_1 r^{10} \ldots$$

and a second surface having an aspheric profile defined as:

$$sag_2 = \frac{\rho_2 r^2}{1 + SQT[1 - (1 + k_2)\rho_2^2 r^2]} + A_2 r^4 + B_2 r^6 + C_2 r^8 + D_2 r^{10} \ldots$$

Where sag represents sagittal height, and $\rho_1$ = 1/radius of first surface vertex $\rho_2$ = 1/radius of second surface vertex $k_1$ = conic coefficient of first surface ($-3.5 < k_1 < 0.0$)

$k_2$ = conic coefficient of second surface ($-15.0 < k_2 < -5.0$)

$A_1$ through $D_1$ and $A_2$ through $D_2$ = general aspheric terms and are non-zero on at least one of said first or second surfaces, and the vertex curvatures $\rho_1$ and $\rho 2$ satisfy $$0.667 < \frac{|\rho_1|}{|\rho_2|} < 1.50$$

Figure 6:
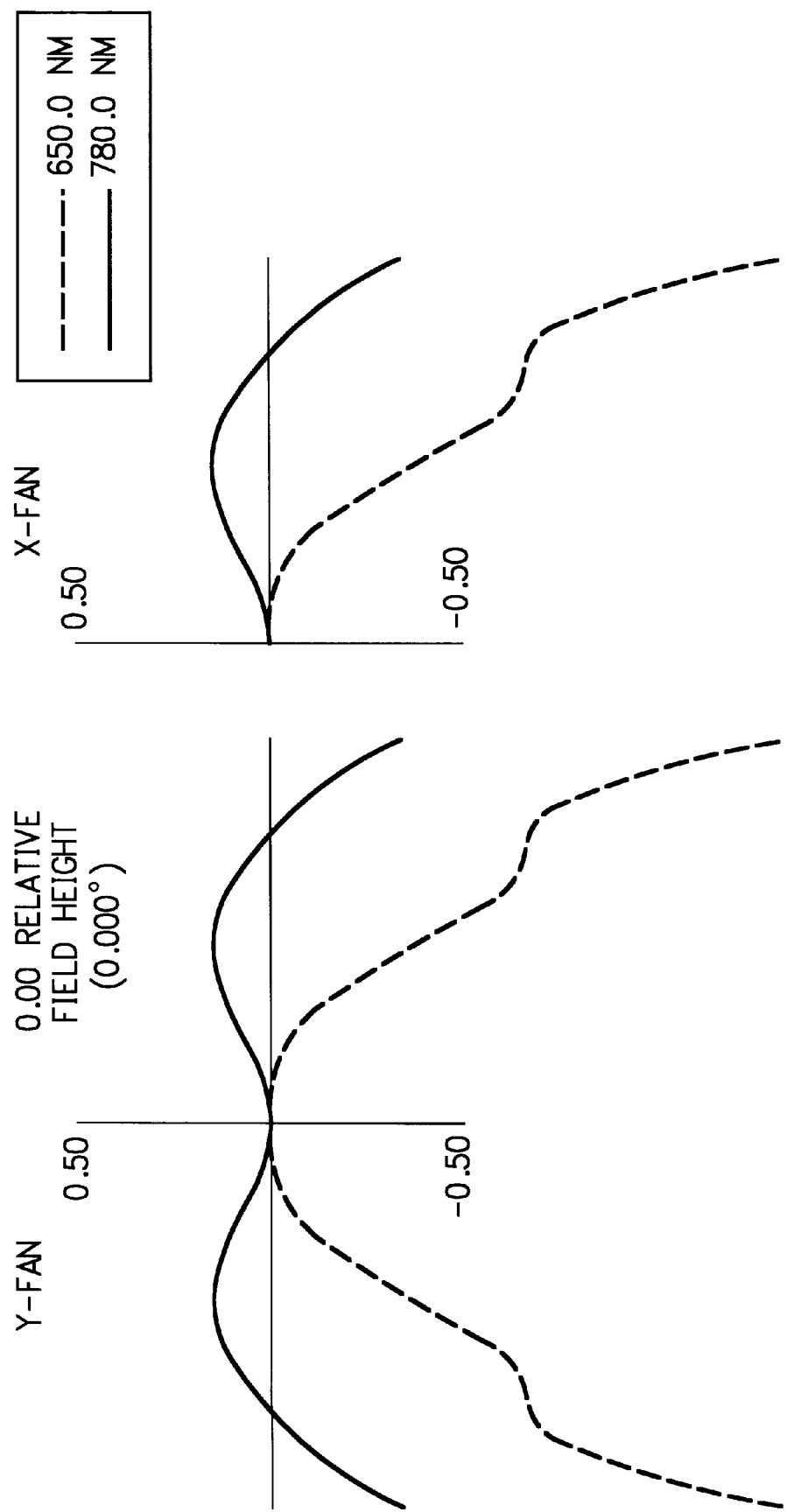
FIG. 6 is a graphical representation of the wavefront errors of the single objective lens shown in FIG. 5.

FIG. 6 shows the wavefront errors of the first embodiment objective (shown in FIG. 5) for both the CD and DVD operating conditions. Note that the P-V wavefront error for the DVD case is about the Rayleigh limit of 0.250 wave.

Figure 7:
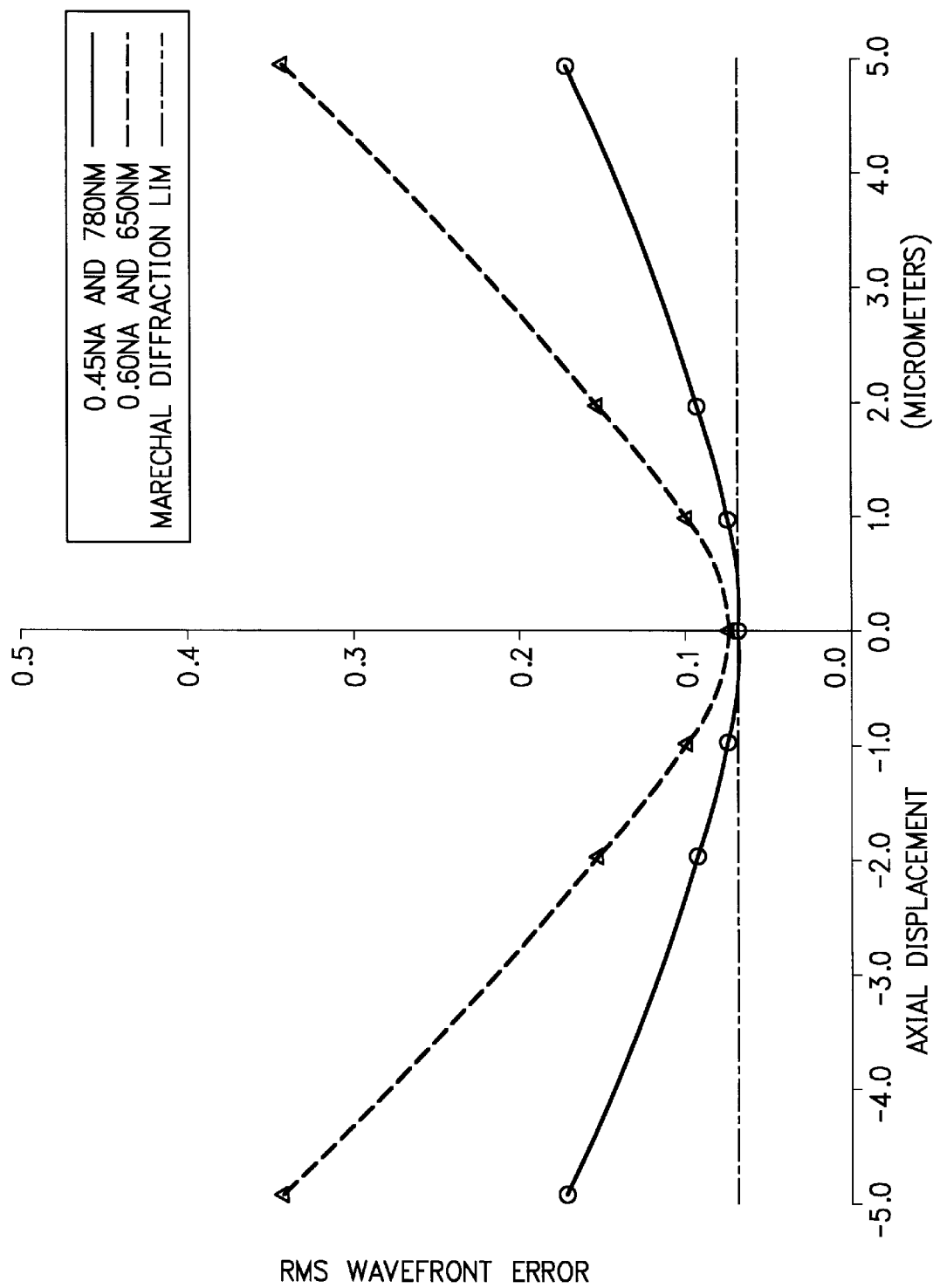
FIG. 7 is a graphical representation showing the depth of focus defined as the RMS wavefront error for the single objective lens shown in FIG. 5.

FIG. 7 shows the RMS wavefront error for the system of FIG. 5 through the depth of focus and verifies that the nominal system is at the limit of being diffraction-limited and that there is essentially no margin for fabrication tolerances. The first embodiment is a theoretically viable solution but it requires very tight manufacturing processes to produce economic yields.

The preferred embodiment uses a diffractive surface on one side of the objective. Diffractive surfaces introduce an additional aberration-correction feature that refractive aspheric surfaces cannot provide. Diffractive surfaces change the wavefront differently for different wavelengths. A positive powered diffractive surface bends longer wavelength light more than shorter wavelength light. This is the opposite behavior of a refractive aspheric surface. This new aberration-correction feature permits a single element objective lens to correct most of the spherochromatism that limits the performance of a simple refractive aspheric lens.

Figure 8:
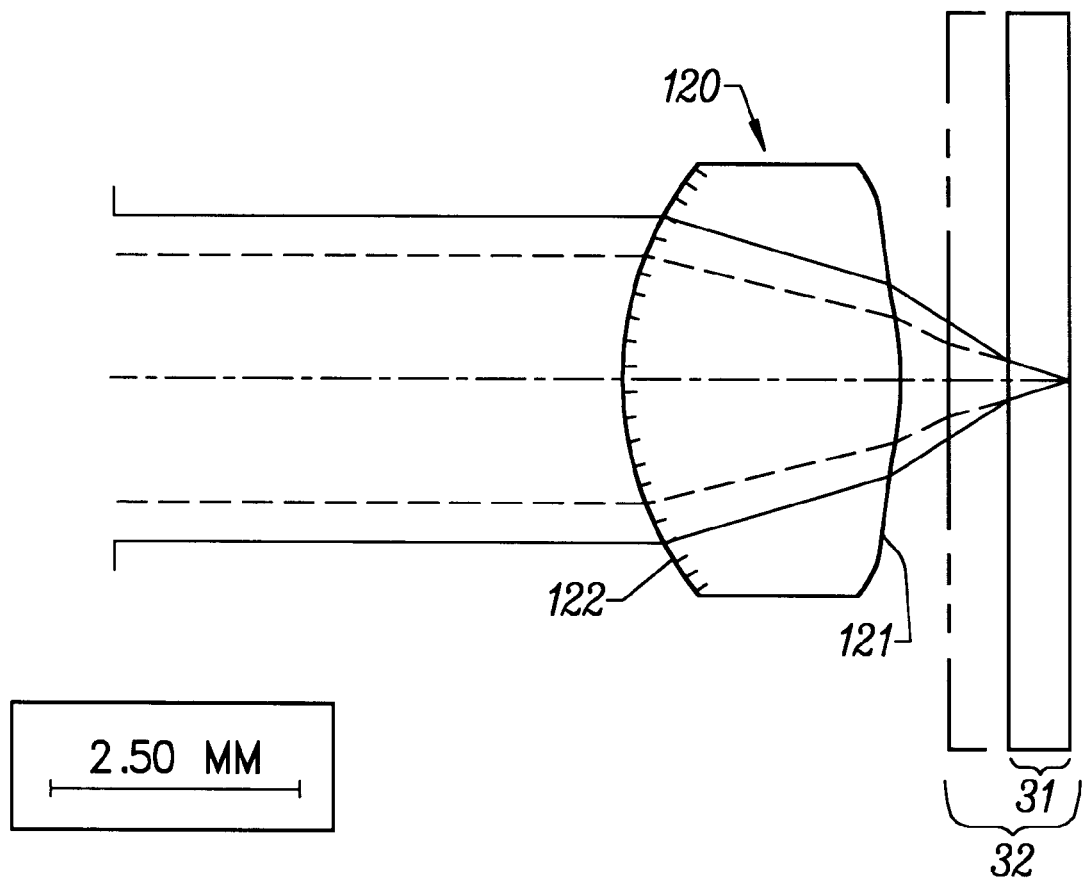
FIG. 8 is a schematic representation of a second and preferred embodiment of the present invention using one diffractive and one aspheric surface.

FIG. 8 shows the preferred embodiment single element objective lens 120. The first surface 121 nearest the disk is aspheric and the second surface 122 furthest from the disk has a diffractive surface imposed on a spherical base curve. The diffractive surface provides the same aspheric correction of spherical aberration provided by a refractive aspheric surface but also provides spherochromatism correction. The objective has a slightly different back focal distance for the two wavelengths of interest but this is unimportant because the autofocus mechanism brings the objective to its best focus.

Diffractive surfaces are known in the prior art where they are widely used to correct the chromatic aberration of a singlet operating over a broad spectral band or to correct the spherical aberration of a singlet over a very narrow spectral band. The use of a diffractive surface to correct sperochromatism of a singlet operating at two different wavelengths is not known in the prior art.

A diffractive surface consists of microscopic grooves in the surface of an optical element. The grooves are widest at the center of the optical element and progressively decrease groove width toward the periphery of the element. The groove width is similar in magnitude to the wavelength of light being used, so the grooves act as a diffraction grating to bend the light. The bending of light is due to diffraction rather than refraction (as produced by Fresnel lenses). Because the groove widths become smaller near the element periphery, the incident wavefront bends more near the edge of the optical element than at the center and the wavefront is therefore focused by diffraction.

Because diffraction is wavelength dependent, the wavefront focusing changes with wavelength to correct chromatic aberration. Because the rate at which the groove widths change can be adjusted to make the surface behave like an aspheric refractive surface, spherical aberration can be corrected.

Figure 12:
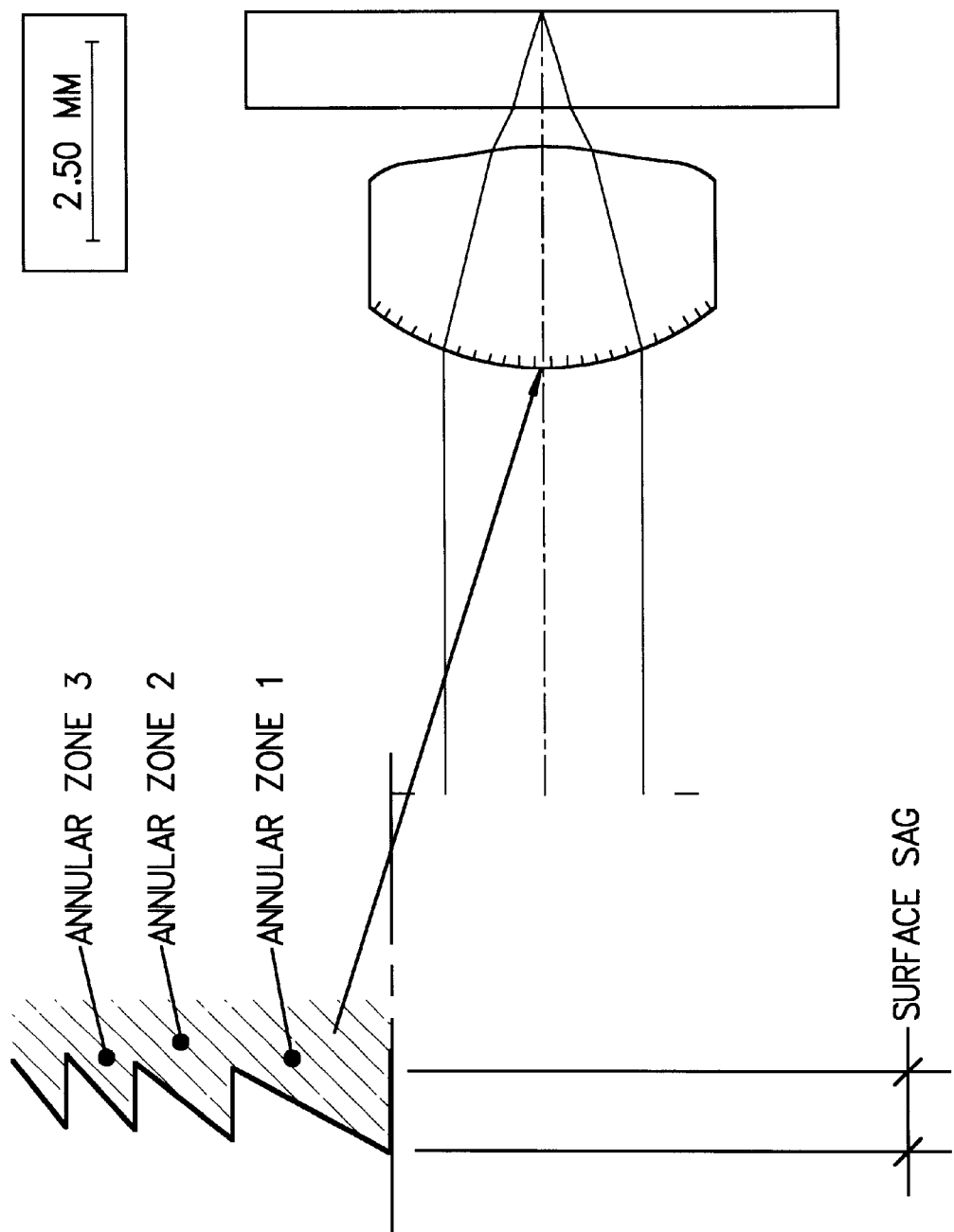
FIG. 12 is an exaggerated representation of the diffractive surface used in the preferred embodiment shown in FIG. 8.

FIG. 12 shows an exaggerated view of the diffractive surface. The actual groove depth is about 1.0 micrometer. The diffractive surface is described by a polynomial phase function which expresses how many waves of optical path are added or subtracted from each radial zone of the wavefront. The polynomial phase function is $$\text{Phase} = C_2 r^2 + C_4 r^4$$

Where $C_2$ = diffractive power term which controls chromatic aberration correction and = $0.01 < C_2 < 0.05$ $C_4$ = aspheric power term which controls spherical aberration correction and = $0.0005 < C_4 < 0.005$ The first surface 121 shown in FIG. 8 can be described mathematically as follows:

a first aspheric surface defined as:

$$sag_1 = \frac{\rho_1 r^2}{1 + SQT[1 - (1+k_1)\rho_1^2 r^2]} + A_1 r^4 + B_1 r^6 + C_1 r^8 + D_1 r^{10} \ldots$$

the second surface 122 has a spherical profile on which is imposed a diffractive surface 122d. The diffractive surface 122d has a polynomial phase function with at least the second and fourth power terms non-zero where $$\text{Phase} = C_2 r^2 + C_4 r^4$$

Figure 9:
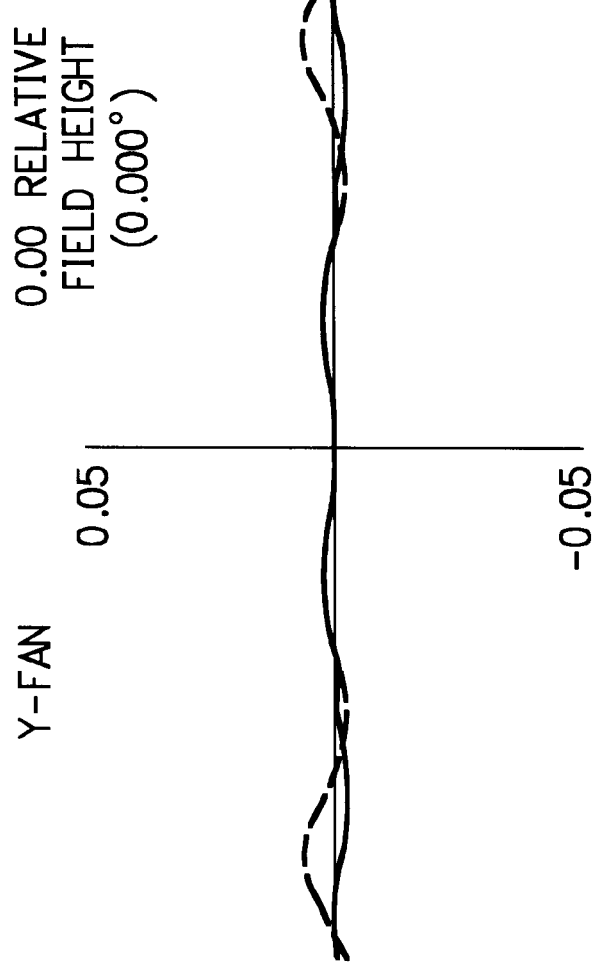
FIG. 9 is a graphical representation showing the wavefront errors for the lens design shown in FIG. 8.

FIG. 9 shows the wavefront error for the diffractive objective of FIG. 8. It is significant that the wavefront error vertical scale is ten times more sensitive than the prior plots.

The wavefront error is essentially zero and the more sensitive scale is needed to see any wavefront error in this plot.

Figure 10:
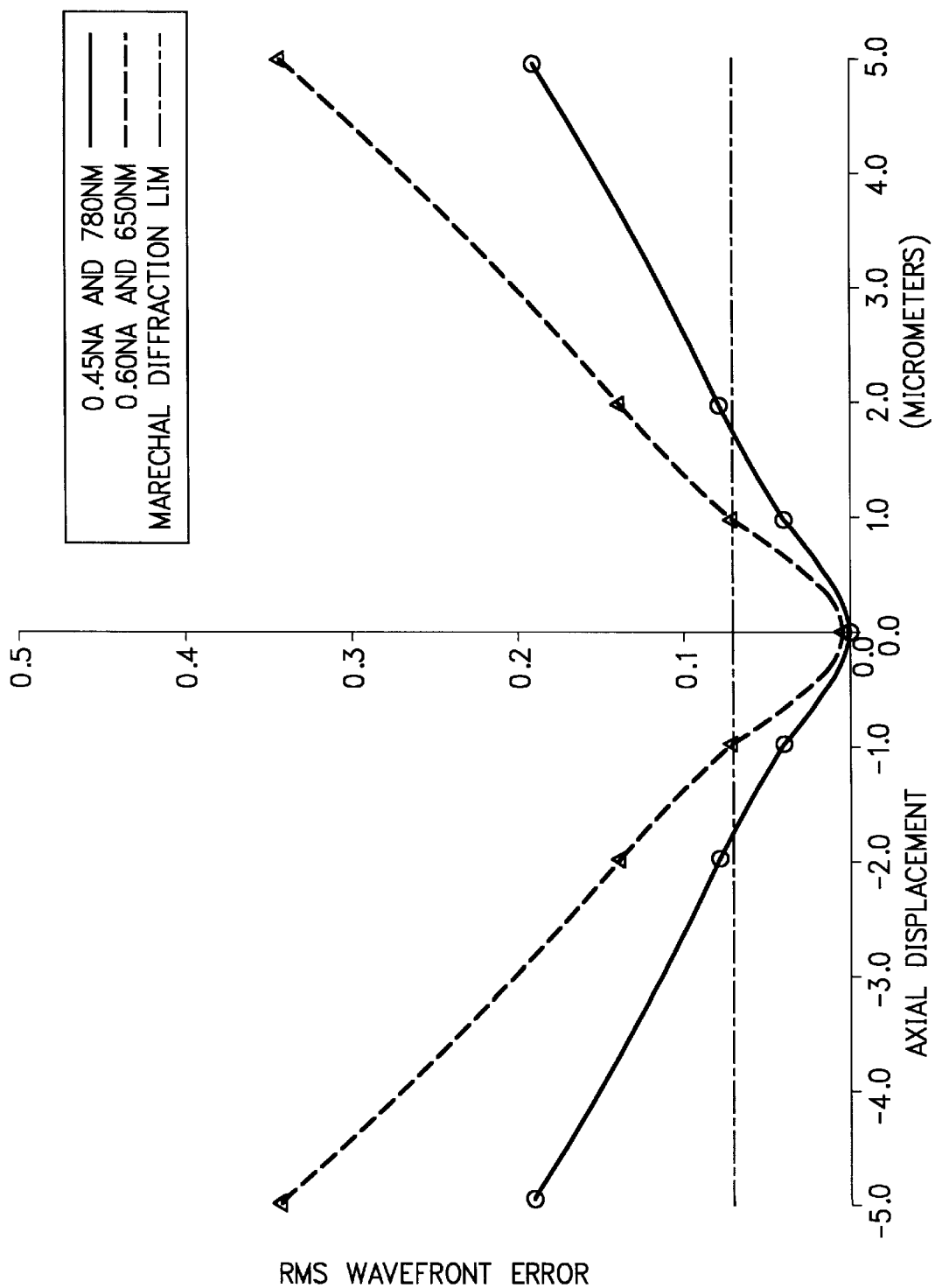
FIG. 10 is a graphical representation showing the depth of focus properties of the system shown in FIG. 8.

FIG. 10 shows the depth of focus properties of the diffractive objective of FIG. 8. The performance of the 0.45 NA, 780 nm system is better than the prior art. This permits a slightly greater fabrication tolerance margin compared to prior art objective lenses. The 0.60 NA, 650 nm nominal system depth of focus is about +1.0 micrometer. After fabrication tolerances are considered, the depth of focus will be on the order of ±0.7 micrometer. This is equivalent to the depth of focus that can be achieved by a 0.60 NA, 650 nm objective that only operates with a DVD format reader.

Figure 11:
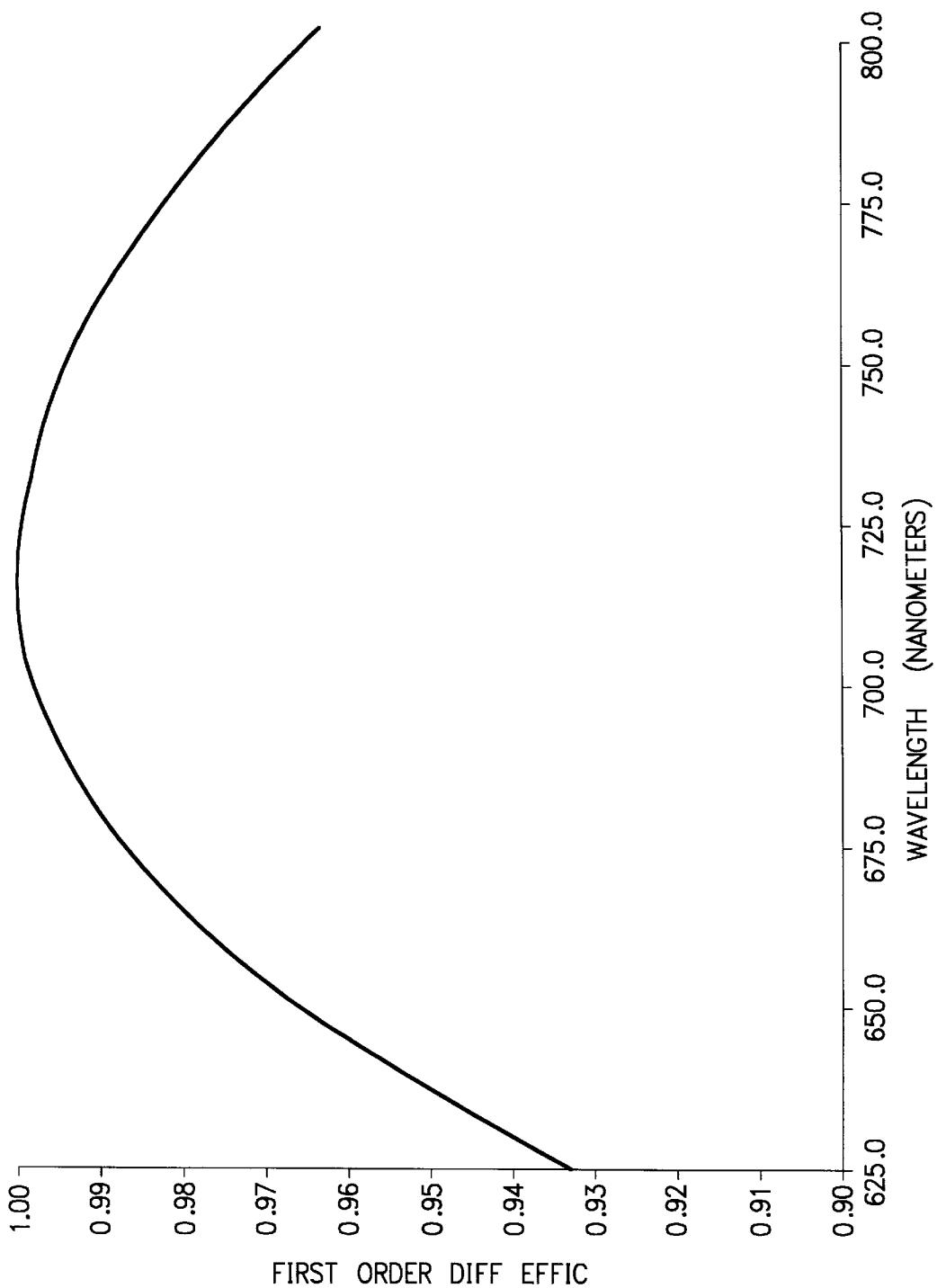
FIG. 11 is a graphical representation of the percentage of light focused by a diffractive surface showing wavelength dependency.

FIG. 11 shows an important feature of diffractive surfaces. The percentage of light that is focused by a diffractive surface is wavelength dependent and several different images can be produced in different diffraction orders. The proper choice of the diffractive surface depth will cause essentially all of the energy in one wavelength to be in the image of the preferred first diffraction order. Because the optimum depth is wavelength dependent and the laser diodes operate at 780 nm and 650 nm, not all of the energy in these two wavelengths can be directed into their respective first order images. The depth of the diffractive surface of this invention is, therefore, chosen midway between these two wavelengths at a wavelength value of 715 nm.

FIG. 11 shows that 0.97 of the energy is directed to the respective first order images when this condition is met. The remaining 0.03 of the energy is primarily directed into the zero diffraction order and is distributed over a large area of the optical disk and produces a negligible background signal.

Modifications of design may be made without departing from the invention. For example, the diffractive surface may be carried by the lens surface 21 closest to the disk. Various types of collimators and beam-splitters may be used as well as laser diodes of various wavelengths. Various materials may be used for the objective lens, including glass and PMMA.

What is claimed is:

1. An optical disk reader or optical read/write system capable of operating in either a compact disk (CD) or digital versatile disk (DVD) format, comprising:

disk support and drive means capable of supporting and driving either a compact disk having a disk substrate of thickness Y or a digital versatile disk having a disk substrate of thickness X, a first laser diode operating with an output beam having a first wavelength, a second laser diode operating with an output beam having a second wavelength different from said first wavelength, optical means for either directing the output beam of said first laser diode at a said compact disk when carried by said disk support and drive means or directing the output beam of said second laser diode at a said digital versatile disk when carried by said disk support and drive means, a single element objective lens optically positioned between said disk support and drive means on one end and said first and second laser diodes on another end, said single element objective lens having a central aperture zone and an outer aperture zone, said central aperture zone being profiled to operate at a first numerical aperture (NA) and said output beam of said first laser diode being optically confined to said central aperture zone, said outer aperture zone together with said central aperture zone being profiled to operate at a second numerical aperture (NA) and wherein said output beam of said second laser diode has ray fans extending across the full aperture of said lens, and diffractive means carried by said single element objective lens, said diffractive means providing sufficient aspheric surface power for spherical aberration correction and providing correction for spherochromatism.

2. The apparatus of claim 1 wherein said lens has first and second surfaces, and said first surface is located closer to said disk support and drive means than said second surface and said diffractive means is carried by said second surface.

3. The apparatus of claim 1 wherein said lens has first and second surfaces, and said first surface is located closer to said disk support and drive means than said second surface and said diffractive means is carried by said first surface.

4. The apparatus of claim 1 wherein said diffractive means provides sufficient correction for spherical aberration and for spherochromatism that said single element objective lens achieves diffraction-limited image quality for both CD and DVD formats.

5. An optical disk reader or optical read/write system capable of operating in either a compact disk (CD) or digital versatile disk (DVD) format, comprising:

disk support and drive means capable of supporting and driving either a compact disk having a disk substrate of thickness 2X or a digital versatile disk having a disk substrate of thickness X, a first laser diode operating with an output beam wavelength of approximately 780 nm, a second laser diode operating with an output beam wavelength of approximately 650 nm, optical means for either directing the output beam of said first laser diode at a said compact disk when carried by said disk support and drive means or directing the output beam of said second laser diode at a said digital versatile disk when carried by said disk support and drive means, a single element objective lens optically positioned between said disk support and drive means on one end and said first and second laser diodes on another end, said single element objective lens having first and second surfaces, said first surface having an aspheric profile, said single element objective lens having a central aperture zone and an outer aperture zone, said central aperture zone being profiled to operate at approximately a 0.45 numerical aperture (NA) and said output beam of said first laser diode being optically confined to said central aperture zone, said outer aperture zone together with said central aperture zone being profiled to operate at approximately a 0.60 numerical aperture (NA) and wherein said output beam of said second laser diode has ray fans extending across the full aperture of said lens, and diffractive means carried by said single element objective lens, said diffractive means providing sufficient aspheric surface power for spherical aberration correction and providing correction for spherochromatism.

6. The apparatus of claim 5 wherein said diffractive means has a predetermined depth to optimize diffraction efficiency for both laser diode wavelengths.

7. The apparatus of claim 6 wherein said first surface is located closer to said disk support and drive means than said second surface and said diffractive means is carried by said second surface.

8. The apparatus of claim 7 wherein said diffractive means provides sufficient correction for spherical aberration and for spherochromatism that said single element objective lens achieves diffraction-limited image quality for both CD and DVD formats.

* * * * *